No. 852,385. PATENTED APR. 30, 1907.
M. F. HOLBROOK.
FRUIT COOKER.
APPLICATION FILED OCT. 17, 1906.
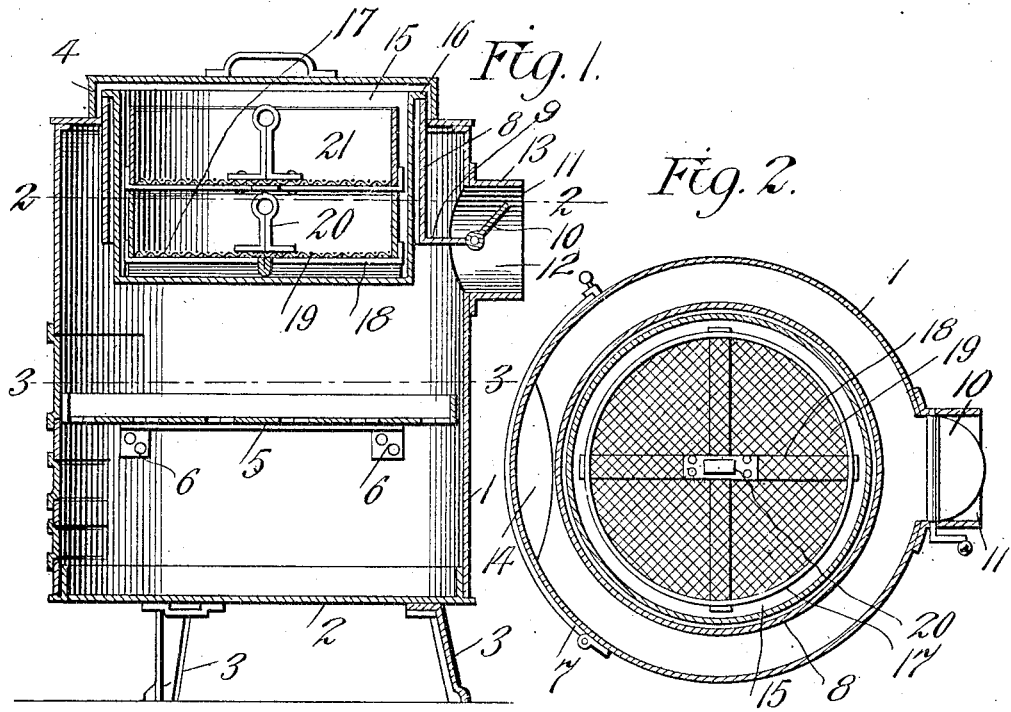
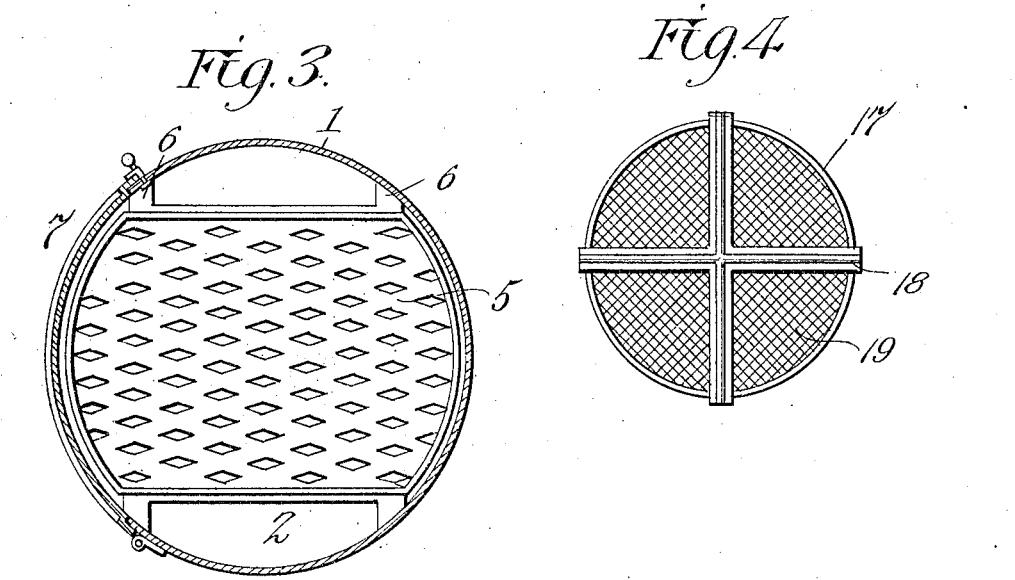
Witnesses
Inventor
Milo F. Holbrook,
By Victor J. Evans
Attorney
THE NORRIS PETERS CO., WASHINGTON, D. C.

UNITED STATES PATENT OFFICE.

MILO FRANKLIN HOLBROOK, OF LONGVIEW, TEXAS, ASSIGNOR OF ONE-HALF TO J. Y. HOLBROOK, OF DALLAS, TEXAS.

FRUIT-COOKER.

No. 852,385.  Specification of Letters Patent.  Patented April 30, 1907.

Application filed October 17, 1906. Serial No. 339,404.

*To all whom it may concern:*

Be it known that I, MILO F. HOLBROOK, a citizen of the United States, residing at Longview, in the county of Gregg and State of Texas, have invented new and useful Improvements in Fruit-Cookers, of which the following is a specification.

This invention relates to fruit cookers, designed more particularly for use as a family cooker for fruits.

One of the principal objects of the invention is to provide a simple stove for cooking and canning fruits and to provide in such stove a damper which may be operated to throw the heat to the upper or lower end of the fruit container.

Another object of the invention is to provide means whereby the grate may be removed in order that the stove may be utilized either as a wood or coal stove or in which fuel of various kinds may be utilized.

These and other objects may be attained by means of the construction illustrated in the accompanying drawings, in which:

Figure 1 is a central, vertical section of a fruit cooker made in accordance with my invention. Fig. 2 is a horizontal sectional view on the line 2—2 of Fig. 1. Fig. 3 is a similar view on the line 3—3 of Fig. 1. Fig. 4 is a bottom plan view of the lower foraminous tray.

Referring to the accompanying drawings, for a more particular description of my invention, the numeral 1 designates a casing forming the outer wall of the stove or cooker and provided with a removable bottom 2 in which legs 3 are fitted in any suitable manner. The upper end of the stove is open and is designed to be closed by a cover 4. A grate 5 is mounted to slide upon brackets 6 to be removable through the door 7 whenever it is desired to use the stove for wood or other fuel outside the house. Extending down through the upper end of the stove is a cylindrical casing 8, said casing having an outwardly extending flange 9 to which is pivoted a damper 10, said damper being substantially semi-circular in form and adapted to close the smoke outlet 11 at the top, or the outlet 12 at the bottom of the short pipe section 13 connected to the stove.

The casing 8 is provided with a cut away portion 14 forming a continuation of the flange 9 at a point opposite the pipe section 13. The result of this construction is that when the damper is thrown upward the heat will surround the casing 8 below and when the damper is moved to its lower position the heat will ascend and surround the upper part of the casing 8. A hollow receptacle 15 is provided with a surrounding flange 16 which rests upon the upper edge of the casing 8 and extends down below the flange 9 thereof and is provided with an imperforate bottom. A fruit tray 17 provided with crossed metal supports 18 and a foraminous bottom 19 is fitted within the receptacle 15 and is provided with a handle 20 by means of which the tray may be removed from the receptacle. The crossed supports 18 serve to raise the tray above the inner bottom of the receptacle 15 when in place. An upper tray 21 provided with a foraminous bottom is supported upon the upper edge of the tray 17 and is also provided with a handle or device by which it may be removed from the receptacle 15.

The operation of my invention may be described as follows: The fruit to be preserved may be placed in the trays 17 and 21 and water may be poured in to cover the same and the trays may be raised and lowered in the water to clean the same, after which the fruit may be cooked in said trays and the trays removed, leaving the fruit juice in the receptacle 15 for subsequent canning. The fuel may be placed upon the grate 5 or the grate may be removed and the fire made within the bottom portion of the stove. Should the fruit require more cooking at the top and less at the bottom, the damper may be operated to throw the heat to the top or bottom of the cooker.

From the foregoing it will be obvious that a device made in accordance with my invention may be used to advantage in cooking fruit in quantities necessary for family use; that the device is simple in construction and can be quickly adjusted for different conditions and different fuels and that the heat may be regulated to cook the fruit uniformly from top to bottom.

Having thus described my invention, what I claim is:

The herein described fruit cooker comprising a casing, a cylinder fitted in the upper end of the casing, said cylinder having a horizontal flange, said flange being cut away to provide a communicating passage between the upper and lower portions of the casing, a receptacle fitted within the cylinder provided with a top flange resting upon the upper edge 5 of said cylinder, a cover for said cylinder, a pipe section communicating with said casing, a semi-circular damper hinged within said pipe section for closing the upper or lower portions of said pipe section to throw the heat underneath the receptacle or around the upper portion thereof, essentially as described.

In testimony whereof, I affix my signature in presence of two witnesses.

MILO FRANKLIN HOLBROOK.

Witnesses:
 DUSH SHAW,
 ABE BEHYMER.